United States Patent
Baumstein (10) Patent No.: US 9,140,812 B2
(45) Date of Patent: Sep. 22, 2015

(54) USING PROJECTION ONTO CONVEX SETS TO CONSTRAIN FULL-WAVEFIELD INVERSION

(75) Inventor: Anatoly Baumstein, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 408 days.

(21) Appl. No.: 13/533,603

(22) Filed: Jun. 26, 2012

(65) Prior Publication Data

US 2013/0060539 A1    Mar. 7, 2013

Related U.S. Application Data

(60) Provisional application No. 61/530,603, filed on Sep. 2, 2011.

(51) Int. Cl.
*G06G 7/48* (2006.01)
*G01V 1/28* (2006.01)

(52) U.S. Cl.
CPC .............. *G01V 1/28* (2013.01); *G01V 2210/67* (2013.01)

(58) Field of Classification Search
CPC ......... E21B 49/00; E21B 43/00; G01V 11/00; G06F 2217/16; G06F 17/5018
USPC .......................................................... 703/10
See application file for complete search history.

(56) References Cited

U.S. PATENT DOCUMENTS

| | | | |
|---|---|---|---|
| 3,812,457 A | 5/1974 | Weller | |
| 3,864,667 A | 2/1975 | Bahjat | |
| 4,159,463 A | 6/1979 | Silverman | |
| 4,168,485 A | 9/1979 | Payton et al. | |
| 4,545,039 A | 10/1985 | Savit | |
| 4,562,540 A | 12/1985 | Devaney | |
| 4,575,830 A | 3/1986 | Ingram et al. | |
| 4,594,662 A | 6/1986 | Devaney | |
| 4,636,956 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |

(Continued)

FOREIGN PATENT DOCUMENTS

| | | |
|---|---|---|
| EP | 1 094 338 | 4/2001 |
| EP | 1 746 443 | 1/2007 |

(Continued)

OTHER PUBLICATIONS

Malinverno "The Reconstruction of Subsurface Property Maps Using Projection Onto Convex Sets" 1994 IEEE.*

(Continued)

*Primary Examiner* — Saif Alhija
(74) *Attorney, Agent, or Firm* — ExxonMobil Upstream Research Company, Law Dept.

(57) ABSTRACT

Method for stabilizing the updated model (13) in iterative seismic data inversion so that the model-simulated data for the next iteration does not "blow up." A Projection Onto Convex Sets ("POCS") operator is defined that converts the matrix corresponding to the model to a positive semi-definite matrix. The stability projection operator may be looped with physical constraint projection operators until the model converges (15). The resulting stable and constrained model is then used to simulate seismic data in the next cycle of the outer iteration loop (16).

16 Claims, 2 Drawing Sheets

(56) References Cited

U.S. PATENT DOCUMENTS

| | | |
|---|---|---|
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,791,899 B2 | 9/2004 | Blanch et al. |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2006/0265132 A1 | 11/2006 | Rickett |
| 2007/0036030 A1 | 2/2007 | Baumel et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0067041 A1 | 3/2009 | Izumi |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2009/0292476 A1 | 11/2009 | Abma |
| 2009/0303834 A1* | 12/2009 | Sengupta et al. ............... 367/73 |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212909 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2010/0322032 A1 | 12/2010 | Shin |
| 2011/0000678 A1 | 1/2011 | Krebs et al. |
| 2011/0040926 A1 | 2/2011 | Frost et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0155389 A1 | 6/2011 | Burtz et al. |
| 2011/0182141 A1 | 7/2011 | Zhamikov et al. |

(56) References Cited

U.S. PATENT DOCUMENTS

| | | | |
|---|---|---|---|
| 2011/0182144 | A1 | 7/2011 | Gray |
| 2011/0191032 | A1 | 8/2011 | Moore |
| 2011/0194379 | A1 | 8/2011 | Lee et al. |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |

OTHER PUBLICATIONS

Korkealaakso "Application of the POCS inversion method to hydrogeological characterization.", 1997.*

Tang, Y. et al. (2010), "Preconditioning full waveform inversion with phase-encoded Hessian," *SEG Expanded Abstracts* 29, pp. 1034-1037.

Tarantola, A. (1984), "Inversion of seismic reflection data in the acoustic approximation," *Geophysics* 49, pp. 1259-1266.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

van Manen, D.J. (2005), "Making wave by time reversal," SEG International Exposition and $75^{th}$ Annual Meeting, *Expanded Abstracts*, pp. 1763-1766.

van Groenestijn, G.J.A. et al. (2009), "Estimating primaries by sparse inversion and application to near-offset reconstruction," *Geophyhsics* 74(3), pp. A23-A28.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Korkealaakso, J. (1997), "Application of the POCS inversion method to hydrogeological characterization," Work Report Posiva-97-05e, Technical Research Centre of Finland Communities and Infrastructure, 53 pgs.

International Search Report & Written Opinion, dated Sep. 17, 2012, PCT/US2012/44239.

Birgin, E.G. et al. (1999), "Nonmonotone Spectral Projected Gradient Methods in Convex Sets," SIAM J. Optimization, pp. 20.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Ostmo, S. et al. (2002), "Finite-difference iterative migration by linearized waveform inversion in the frequency domain," SEG Int'l. Expo. & $72^{nd}$ Ann. Meeting, 4 pgs.

Plessix, R.E. et al. (2004), "Frequency-domain finite-difference amplitude preserving migration," *Geophys. J. Int.* 157, pp. 975-987.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Schuster, G.T. et al. (2010), "Theory of Multisource Crosstalk Reduction by Phase-Encoded Statics," SEG Denver 2010 Ann. Meeting, pp. 3110-3114.

Sheen, D-H. et al. (2006), "Time domain Gauss-Newton seismic waveform inversion in elastic media," Geophysics J. Int. 167, pp. 1373-1384.

(56) References Cited

OTHER PUBLICATIONS

Shen, P. et al. (2003), "Differential semblance velocity analysis by wave-equation migration," 73$^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E. et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Simard, P.Y. et al. (1990), "Vector Field Restoration by the Method of Convex Projections," *Computer Vision, Graphics and Image Processing* 52, pp. 360-385.

Shin, C. et al. (2001), "Waveform inversion using a logarithmic wavefield," *Geophysics* 49, pp. 592-606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. P.SM213-SM221.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods Volume I—Chapter 7—Surface Waves in a Vertically Heterogenous Medium," W.H. Freeman and Co., pp. 259-318.

Aki, K. et al. (1980), "Quantitative Seismology: Theory and Methods Volume I," W.H. Freeman and Co., p. 173.

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," *SEG Expanded Abstracts*, pp. 2288-2292.

Beylkin, G. (1985), "Imaging of discontinuities in the inverse scattering problem by inversion of a causal generalized Radon transform," *J. Math. Phys.* 26, pp. 99-108.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Huang, Y. et al. (2012), "Multisource least-squares migration of marine streamer and land data with frequency-division encoding," *Geophysical Prospecting* 60, pp. 663-680.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

(56) References Cited

OTHER PUBLICATIONS

Hu, L.Z. et al. (1987), "Wave-field transformations of vertical seismic profiles," *Geophysics* 52, pp. 307-321.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," The Leading Edge, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," 80th SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

U.S. Appl. No. 13/224,005, filed Sep. 1, 2011, Routh et al.

International Preliminary Report on Patentability, PCT/US12/244239, dated Dec. 6, 2013.

\* cited by examiner

USING PROJECTION ONTO CONVEX SETS TO CONSTRAIN FULL-WAVEFIELD INVERSION

CROSS-REFERENCE TO RELATED APPLICATION

This application claims the benefit of U.S. Provisional Patent Application 61/530,603, filed Sep. 2, 2011, entitled USING PROJECTION ONTO CONVEX SETS TO CONSTRAIN FULL-WAVEFIELD INVERSION, the entirety of which is incorporated by reference herein.

FIELD OF THE INVENTION

This invention relates to the field of geophysical prospecting and, more particularly, to seismic data processing. Specifically, the invention is a method for ensuring stability of simulations in Full-Wavefield Inversion.

BACKGROUND OF THE INVENTION

During seismic survey of a subterranean region, seismic data are acquired typically by positioning a seismic source at a chosen shot location, and measuring the seismic reflections generated by the source using receivers placed at selected locations. The measured reflections are referred to as a single "shot record". Many shot records are measured during a survey by moving the source and receivers to different locations and repeating the aforementioned process. The survey can then be used to perform Full-Wavefield Inversion, which uses the information contained in the shot records to determine physical properties of the subterranean region (e.g., speed of sound in the medium, density distribution, etc . . . ) Full-Wavefield Inversion is an iterative process, each iteration comprising the steps of forward modeling to create model data and objective function computation to measure the similarity between model and field data. Physical properties of the subsurface are adjusted at each iteration to ensure progressively better agreement between model and field data. Modification of subsurface properties needs to be carried out in such a way that known relationships between various properties are not violated. The update process typically generates several trial models, which may become unstable, leading to a "blow-up" (unbounded growth of the solution, until the numbers become so large that they can no longer be represented in a computer) of numerical simulations. Mathematically, a stable model corresponds to a positive semi-definite matrix of elastic constants (a matrix is positive semi-definite when all of its eigenvalues are non-negative), which enter as coefficients into the wave equation. The wave equation can be written in many different forms, depending on the level of physics that needs to be included in a simulation. For example, elastic propagation (a fairly general case) is described by $$\rho(x)\partial_t^2 u(x,t) - \nabla \cdot T(x,t) = g(x,t)$$

$$T(x,t) = C(x) : \nabla u(x,\tau) \equiv c_{ijkl}(x)\partial_k u_l(x,\tau)'$$

where T is the stress tensor, x is a vector representing the three spatial coordinates, t is time, g is a source function, and $c_{ijpq}$ is a fourth-order tensor of elastic constants.

For convenience, $c_{ijpq}$ is often mapped into a 6×6 matrix using Voight notation (Tsvankin (2005), see pg. 8):

$C_{IJ} = c_{ijkl}$, where $I = i\delta_{ij} + (1 - \delta_{ij})(9 - i - j);$ $J = k\delta_{kl} + (1 - \delta_{kl})(9 - k - l);$ The $C_{IJ}$ matrix (or an equivalent matrix that represents the fourth-order tensor $c_{ijpq}$) needs to be positive definite (Helbig (1994), chapter 5).

Current Technology

At a given iteration n of inversion, a model update usually involves computing a search direction $s^n$ (this is usually accomplished by computing the gradient of an objective function $f$; often $s^n = -\nabla f$ is used) and performing a "line search", i.e., evaluating objective functions for various trial models which are created through a linear combination of a current model and the search direction:

$$m^{n+1} = m^n + \alpha s^n$$

The search direction is scaled by a "step size" $\alpha$ and added to the current model $m^n$. The value of the scalar $\alpha$ that produces the best value of the objective function is selected and a new updated model is formed using this value. Sometimes (usually if the step size $\alpha$ is chosen to be too large) $m^{n+1}$ may become physically infeasible and lead to a blow-up in numerical simulations. The blow-up may occur even if the model is unstable at only a few spatial locations. If this happens, one is forced to choose a different (usually smaller) step size, thus slowing down the inversion process.

Besides feasibility (stability) constraints described above, it may be appropriate to impose other constraints, e.g., require that all model parameters lie within a certain predetermined interval ("box constraints"). Such constraints are typically incorporated into the inversion process using penalty functions, Lagrange multipliers, or Projection Onto Convex Sets (POCS). The first two methods are appropriate when constraints are "soft", i.e., can be violated at intermediate steps and need to be satisfied only at convergence. The last method, POCS, is appropriate for both soft and "hard" constraints (i.e., constraints which cannot be violated and need to be satisfied for all intermediate models). A conventional way of applying POCS to enforce soft constraints is to perform a projection at the end of the line search:

$$m^{n+1} = P[m^n + \alpha s^n],$$

where P is a projection operator. Hard constraints can be enforced in a similar manner:

$$m^{n+1} = m^n + \beta(P[m^n + \alpha s^n] - m^n).$$

Fixing $\alpha$, applying the projection operator P before the line search starts, and then performing a line search with $0 < \beta < 1$ guarantees that all intermediate models will satisfy the desired constraint.

SUMMARY OF THE INVENTION

In one embodiment, the invention is a computer-implemented method for ensuring stability of iterative inversion of seismic data to infer a model of at least one physical property of a subsurface region, wherein a model update is computed, using a programmed computer, for a next iteration by optimizing an objective function measuring misfit between the seismic data and model-simulated seismic data, said method comprising:

determining when a model update will cause an unstable simulation, and in response to such a determination, using a Projection Onto Convex Sets to find a nearest stable model.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A central concept of this invention is the recognition that it is possible to ensure stability of forward simulations while performing a line search in iterative full wavefield inversion by converting an unstable rock physics model into a stable one through application of Projection Onto Convex Sets ("POCS"). Since positive semi-definite matrices that correspond to stable rock physics models form a convex set, it is possible to define a projection operator that will convert any matrix into the nearest positive semi-definite matrix. However, this step may be insufficient, as the matrix may need to satisfy additional constraints which correspond to known rock-physics relationships between elastic constants, and which become violated when the matrix is converted into a positive semi-definite one. To satisfy these constraints, an additional projection onto the set of such constraints is performed. Alternatively, these constraints might be imposed by a penalty function or a Lagrange multiplier. The process then iterates between making the matrix positive semi-definite and satisfying relationships between elastic constants until a feasible solution is found. Provided projection operators are derived correctly and a feasible model that satisfies all the constraints exists, the method is guaranteed to converge. The resulting model can be used to perform stable simulations. The key advantage over conventional methodologies is that if stability constraints are violated at only a few spatial locations, the application of the proposed method will resolve the problem at those locations without affecting the overall step length (as would be the case with current technology, described above), thereby improving convergence speed.

A practical application of the present inventive method may proceed by first starting with an available set of elastic constants. A matrix of elastic constants corresponding to the chosen level of physics is then formed:

$$C = \begin{pmatrix} C_{11} & C_{12} & C_{13} & C_{14} & C_{15} & C_{16} \\ C_{12} & C_{22} & C_{23} & C_{24} & C_{25} & C_{26} \\ C_{13} & C_{23} & C_{33} & C_{34} & C_{35} & C_{36} \\ C_{14} & C_{24} & C_{34} & C_{44} & C_{45} & C_{46} \\ C_{15} & C_{25} & C_{35} & C_{45} & C_{55} & C_{56} \\ C_{16} & C_{26} & C_{36} & C_{46} & C_{56} & C_{66} \end{pmatrix},$$

where

1. If the medium is isotropic:

$C_{11}=C_{22}=C_{33}=(C_{13}+2C_{55})$;

$C_{44}=C_{55}=C_{66}$;

$C_{12}=C_{13}=C_{23}$.

2. If the medium is vertically transversely isotropic (VTI):

$C_{22}=C_{11}$; $C_{44}=C_{55}$; $C_{23}=C_{13}$;

$C_{12}=C_{11}-2C_{66}$;

A projection operator on the set of positive semi-definite matrices is given below in the "Example" section. To demonstrate how projection operators for conditions 1 and 2 above can be derived (this is a well-known method of deriving projection operators, see, e.g., Simard and Malloux (2000)), we pick the first of the constraints above: $C_{11}=C_{22}$. Suppose that in a matrix C this constraint is not satisfied and we are looking for the "closest" matrix $\tilde{C}$ whose entries would satisfy it. We define "closest" to mean a matrix with elements that minimize the following objective function (measure of distance):

$J(\tilde{C}_{11}-C_{11})^2+(\tilde{C}_{22}-C_{22})^2$

The constraint then can be added using a well-known method of Lagrange multipliers:

$J=(\tilde{C}_{11}-C_{11})^2+(\tilde{C}_{22}-C_{22})^2+\lambda(\tilde{C}_{11}-\tilde{C}_{22})$.

Differentiating this objective function with respect to $\tilde{C}_{11}$, $\tilde{C}_{22}$, and $\lambda$, we obtain the following system of equations:

$2(\tilde{C}_{11}+C_{11})+\lambda=0$ $2(\tilde{C}_{22}-C_{22})-\lambda=0$ $\tilde{C}_{11}-\tilde{C}_{22}=0$ Solving for $\lambda$, we get $\lambda=C_{11}-C_{22}$ and $\tilde{C}_{11}=C_{11}-\lambda/2=(C_{11}+C_{22})/2$ $\tilde{C}_{22}=C_{22}+\lambda/2=(C_{11}+C_{22})/2$ which defines the correct projection operator.

Figure 1:
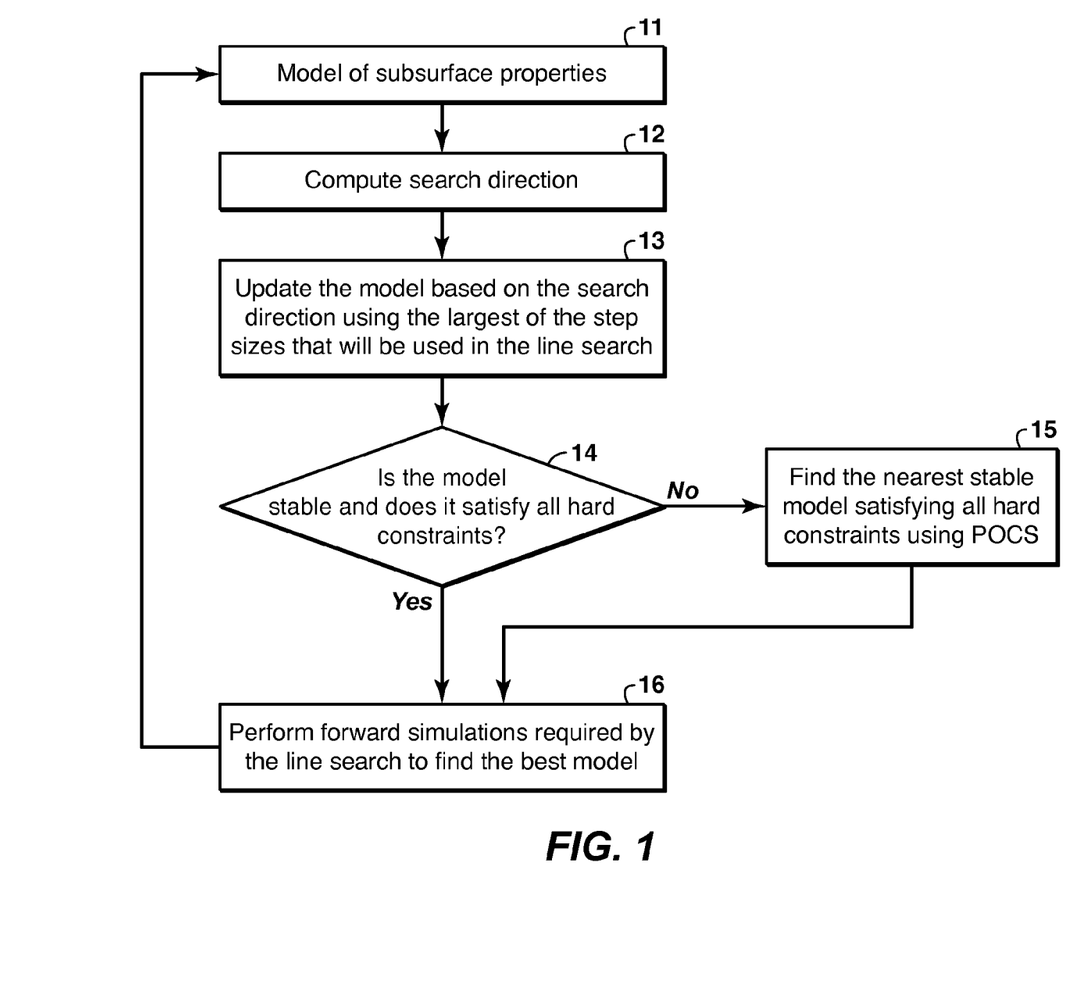
FIG. 1 is a flowchart showing basic steps in one embodiment of the present invention.

FIG. 1 is a flowchart showing basic steps in one embodiment of the present inventive method. At step 11, the flowchart picks up the process at the beginning of an iteration, where the model has been updated in the previous iteration. At step 12, a direction for the line search is computed. This involves using the model to simulate seismic data, then computing an objective function measuring the difference between the simulated data and measured data. Then the gradient of the objective function with respect to each model parameter is computed, and a direction for the line search is determined from the gradient.

At step 13, the model is updated in the search direction using one of a set of step sizes selected for a line search. Typically, the largest of the step sizes is tried first. In terms of the line search model update formulas given at the end of the "Background" section, this means selecting an initial value of $\alpha$ and $\beta$, or just $\alpha$ if a soft constraint is to be used. For a soft constraint, various values of $\alpha$ are tried, beginning with the largest one. For the hard constraint, a reasonably large value of $\alpha$ is selected, and then $\beta$ is varied between one and zero, beginning with the largest value of $\beta$ selected, typically $\beta=1$. At step 14, the model is checked for stability according to whether its corresponding matrix of elastic constants is positive semi-definite or not. The model is also checked to determine whether it satisfies hard physical constraints, if any are being imposed. If the model fails any checks, the method moves to step 15. Here, the nearest stable model satisfying all hard constraints can be found by looping through sequential application of the POCS stability projection operator and a projection operator for the hard constraints. Alternatively, the hard constraints may be imposed by penalty function or Lagrange multiplier. This is usually done by adding them to the objective function, so that they are imposed indirectly, by affecting the value of the objective function. There would be no looping as mentioned just above in this case.

At step 16, using the stable model, a forward simulation is performed to generate synthetic data, and the objective function is computed. This is done for each of the selected values of the step size. This involves an inner loop, not shown in FIG. 1, which returns from step 16 to step 13. The step size that produces the most optimal value of the objective function is selected and used to update the model, and the process returns to step 11 to start the next cycle in the outer loop of the iterative inversion. The invention does not necessarily require a line search. For example, one could compute the Hessian, which allows obtaining an estimate of the step size α, followed by the projection step. The line search in β could then be skipped.

EXAMPLE

Consider a 2D isotropic elastic medium. In this case the following matrix should be positive-definite at each spatial location:

$$M = \begin{pmatrix} C_{33} & 0 & 0 & \lambda \\ 0 & C_{55} & C_{55} & 0 \\ 0 & C_{55} & C_{55} & 0 \\ \lambda & 0 & 0 & C_{33} \end{pmatrix},$$

where $C_{33}=\lambda+2\mu$ and $C_{55}=\mu$ are elastic constants; $\lambda$ and $\mu$ are Lamè parameters. Note that there are in fact several nontrivial constraints that the elements of matrix M must satisfy:
1. M must be positive semi-definite;
2. $M_{14}=M_{41}=M_{11}-2M_{22}$ (this follows from $C_{33}=\lambda+2\mu$ and $C_{55}=\mu$).

We also choose to impose two more constraints (as an illustration of how to incorporate well-log and other a-priori information):
3. $M_{14} \geq \lambda_{min}$ We arbitrarily choose $\lambda_{min}=10^6$; and
4. $C_{33}^{min} \leq C_{33} \leq C_{33}^{max}$ with $C_{33}^{min}=1500^2$ and $C_{33}^{max}=1900^2$.

Suppose we start with the following values of elastic constants: $C_{33}=2050000$ and $C_{55}=2750000$, which violate several of the conditions above. A mathematically rigorous way to convert the resulting matrix into a stable one is to apply the following sequence of projection operators:
1. $M=P^{-1} \max(\Lambda, 0)P$,
where $\Lambda$ is a diagonal matrix of the eigenvalues of M; and P is a matrix comprising its eigenvectors. ($\max(\Lambda,0)$ sets all negative entries of the diagonal matrix $\Lambda$ to zero and leaves all positive values unchanged.) This is known to be a projection operator onto a set of positive semi-definite matrices.

2. $M_{11}^{updated} = M_{11}^{current} + f/4;$
$M_{22}^{updated} = M_{22}^{current} - f/4;$
$M_{14}^{updated} = M_{14}^{current} - f/2;$
$f = \frac{4}{5}(M_{14}^{current} - M_{11}^{current} + 2M_{22}^{current}).$ It can be shown that this is a projection operator corresponding to the second of the conditions listed above.

3. $\lambda = \max(\lambda, \lambda_{min})$
This is a projection operator corresponding to the third of the above conditions.
4. $C_{33}=\min(\max(C_{33},C_{33}^{min}),C_{33}^{max})$
This is a projection operator corresponding to the fourth constraint.

Figure 2:
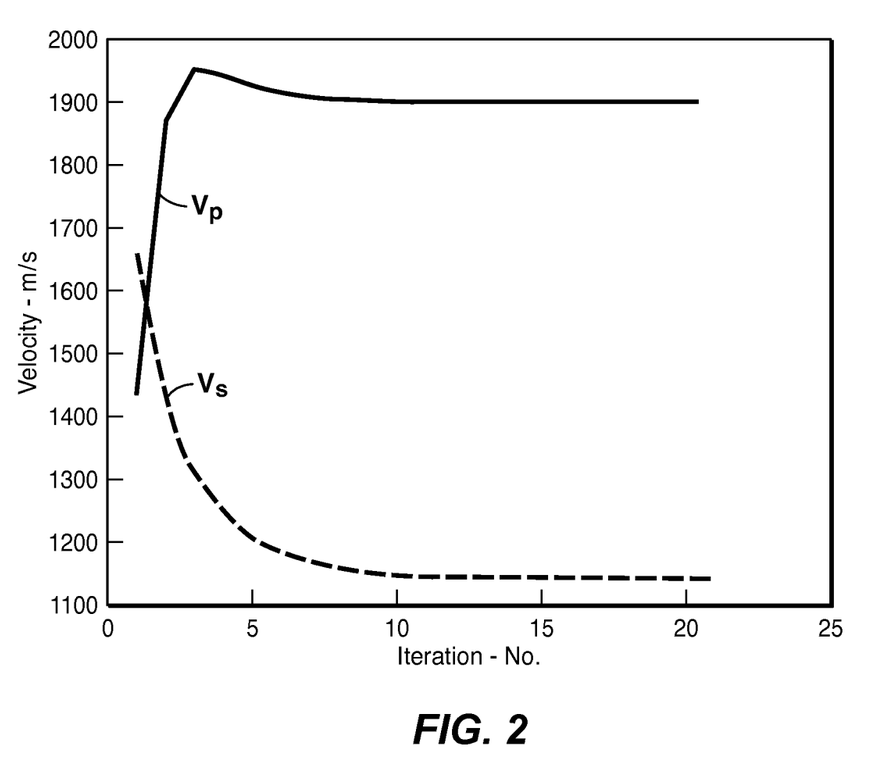
FIG. 2 shows the results of a test example of the present inventive method.

These projection operators are applied in a loop until convergence is achieved. FIG. 2 shows the evolution of the corresponding Vp and Vs. The resulting rock physics model is stable and satisfies all the constraints.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

References

Helbig, K., Foundations of Anisotropy for Exploration Seismics, Chapter 5, Pergamon, New York, 185-194 (1994).

Tsvankin, I., Seismic Signatures and Analysis of Reflection Data in Anisotropic Media, Elsevier Science, 8 (2001).

Simard, P. Y., and G. E. Mailloux, "Vector field restoration by the method of convex projections," *Computer Vision Graphics and Image Processing* 52, 360-385 (1990).

The invention claimed is:

1. A computer-implemented method for ensuring stability of iterative inversion of seismic data to infer a model of at least one physical property of a subsurface region, wherein a model update is computed, using a programmed computer, for a next iteration by optimizing an objective function measuring misfit between the seismic data and model-simulated seismic data, said method comprising:

using the computer, determining when a model update will cause an unstable simulation, and in response to such a determination, using a Projection Onto Convex Sets to find a nearest stable model; and using a final model from the iterative inversion for geophysical prospecting, wherein the optimizing of the objective function comprises performing a line search in model space in a direction indicated by a gradient of the objective function, and wherein the stability projection operator P is applied before beginning the line search, the line search determining an update for each model parameter m from the $i^{th}$ iteration to the i+1 iteration using a relationship that can be expressed as $$m^{n+1}=m^n+\beta(P[m^n+\alpha s^n]-m^n)$$

with the search being on β, 0<β<1, with α fixed.

2. The method of claim 1, further comprising:

determining a matrix of elastic constants of the subsurface region, said matrix corresponding to said model of at least one physical property;

determining whether an updated model will cause an unstable simulation based on whether the matrix of elastic constants corresponding to the updated model is or is not a positive semi-definite matrix;

in response to a determination of instability, defining a stability projection operator that will convert the matrix corresponding to the updated model to a positive semi-definite matrix, said stability projection operator being a Projection Onto Convex Sets operator;

applying the stability projection operator to the matrix corresponding to the updated model, generating a projected matrix, and adjusting the updated model to correspond to the projected matrix; and using the adjusted model to simulate synthetic seismic data for a next iteration.

3. The method of claim 2, further comprising determining one or more physical constraints that the elastic constants in the matrix must satisfy, and for each of the one or more physical constraints, either:

(a) defining a constraint projection operator that will convert the matrix to one that will satisfy the physical constraint, then applying each constraint projection operator sequentially with the application of the stability projection operator to the matrix, and looping through the sequential applications until a preselected convergence criterion or other stopping condition is satisfied; or (b) applying the physical constraint by means of a penalty function or a Lagrange multiplier term added to the objective function.

4. The method of claim 3, wherein the one or more physical constraints are symmetry conditions derived from isotropy or anisotropy assumptions about the subsurface region.

5. The method of claim 3, wherein each constraint projection operator projects the matrix onto a closest matrix in a set of matrices all satisfying the physical constraint, and the stability projection operator projects the matrix onto a closest matrix in a set of positive, semi-definite matrices.

6. The method of claim 3, wherein the constraint projection operator is a Projection Onto Convex Sets operator.

7. The method of claim 2, wherein the stability projection operator involves eigenvalues and eigenvectors of the matrix.

8. The method of claim 2, wherein parameters of the model are related to the elastic constants by one or more rock physics relationships.

9. The method of claim 1, wherein the at least one physical property is selected from a group consisting of P-wave velocity, S-wave velocity, density and acoustic impedance; and the elastic constants comprise linear combinations of Lamé parameters.

10. The method of claim 1, wherein the iterative inversion of the seismic data is full-wavefield inversion.

11. A computer-implemented method for ensuring stability of iterative inversion of seismic data to infer a model of at least one physical property of a subsurface region, wherein a model update is computed, using a programmed computer, for a next iteration by optimizing an objective function measuring misfit between the seismic data and model-simulated seismic data, said method comprising:

using the computer, determining when a model update will cause an unstable simulation, and in response to such a determination, using a Projection Onto Convex Sets to find a nearest stable model, wherein the determining includes determining a matrix of elastic constants of the subsurface region, said matrix corresponding to said model of at least one physical property, determining whether an updated model will cause an unstable simulation based on whether the matrix of elastic constants corresponding to the updated model is or is not a positive semi-definite matrix, in response to a determination of instability, defining a stability projection operator that will convert a matrix corresponding to the updated model to a positive semi-definite matrix, said stability projection operator being a Projection Onto Convex Sets operator, applying the stability projection operator to the matrix corresponding to the updated model, generating a projected matrix, and adjusting the updated model to correspond to the projected matrix, and using the adjusted model to simulate synthetic seismic data for a next iteration; and using a final model from the iterative inversion for geophysical prospecting.

12. The method of claim 11, further comprising determining one or more physical constraints that the elastic constants in the matrix must satisfy, and for each of the one or more physical constraints, either:

(a) defining a constraint projection operator that will convert the matrix to one that will satisfy the physical constraint, then applying each constraint projection operator sequentially with the application of the stability projection operator to the matrix, and looping through the sequential applications until a preselected convergence criterion or other stopping condition is satisfied; or (b) applying the physical constraint by means of a penalty function or a Lagrange multiplier term added to the objective function.

13. The method of claim 12, wherein the one or more physical constraints are symmetry conditions derived from isotropy or anisotropy assumptions about the subsurface region.

14. The method of claim 12, wherein each constraint projection operator projects the matrix onto a closest matrix in a set of matrices all satisfying the physical constraint, and the stability projection operator projects the matrix onto a closest matrix in a set of positive, semi-definite matrices.

15. The method of claim 12, wherein the constraint projection operator is a Projection Onto Convex Sets operator.

16. A computer-implemented method for ensuring stability of iterative inversion of seismic data to infer a model of at least one physical property of a subsurface region, wherein a model update is computed, using a programmed computer, for a next iteration by optimizing an objective function measuring misfit between the seismic data and model-simulated seismic data, said method comprising:

using the computer, determining when a model update will cause an unstable simulation, and in response to such a determination, using a Projection Onto Convex Sets to find a nearest stable model, wherein the determining includes determining a matrix based on elastic constants of the subsurface region, said matrix corresponding to said model of at least one physical property, determining whether an updated model will cause an unstable simulation based on whether the matrix based on elastic constants corresponding to the updated model is or is not a positive semi-definite matrix, in response to a determination of instability, defining a stability projection operator that will convert a matrix corresponding to the updated model to a positive semi-definite matrix, said stability projection operator being a Projection Onto Convex Sets operator, applying the stability projection operator to the matrix corresponding to the updated model, generating a projected matrix, and adjusting the updated model to correspond to the projected matrix, and using the adjusted model to simulate synthetic seismic data for a next iteration; and using a final model from the iterative inversion for geophysical prospecting.

* * * * *